March 27, 1934.  A. T. K. TSENG  1,952,105
HYDRAULIC BRAKE FLUID
Filed July 26, 1930  2 Sheets-Sheet 1
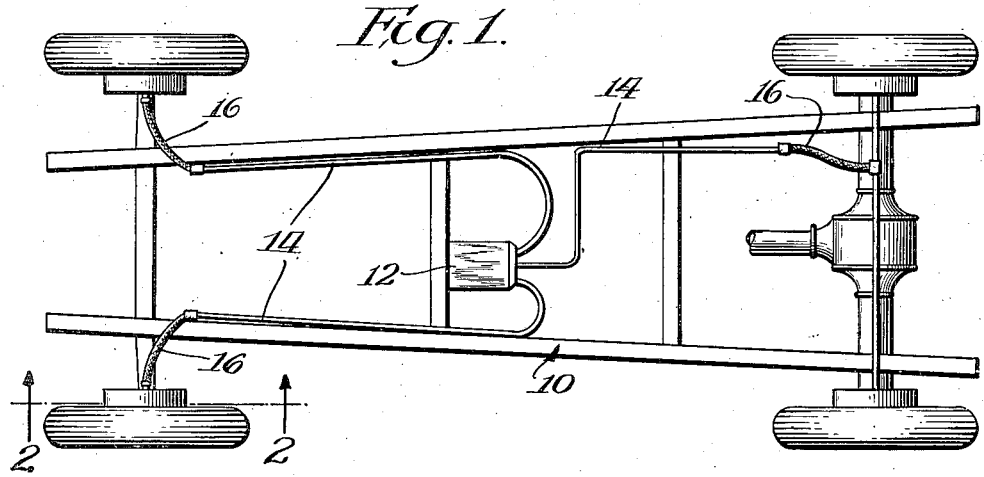
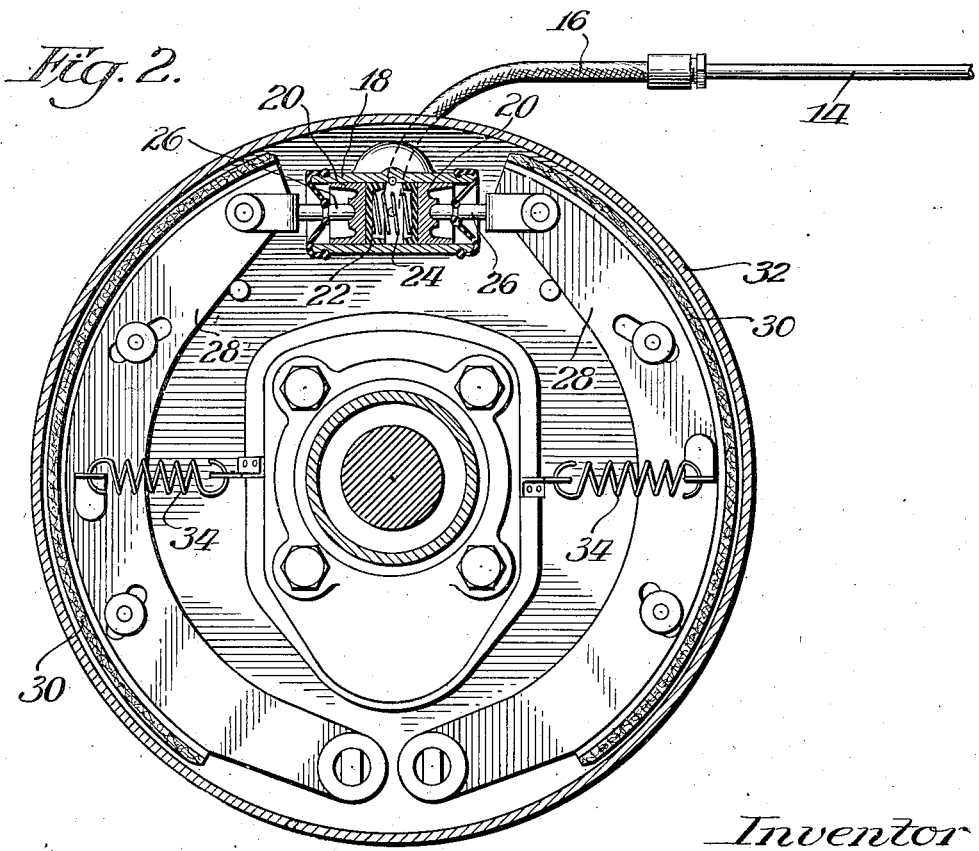
Inventor
Andrew T. K. Tseng
By Williams, Bradbury, McCaleb & Hinkle, Attys.

March 27, 1934.      A. T. K. TSENG      1,952,105
HYDRAULIC BRAKE FLUID

Filed July 26, 1930      2 Sheets-Sheet 2

Furfural Aldehyde.

Furfuryl Acetate.

Furfuryl Alcohol.

Furane.

Furane Ring.

Inventor
Andrew T. K. Tseng.
By Williams, Bradbury, McCaleb
& Hinkle     Attys

Patented Mar. 27, 1934

1,952,105

UNITED STATES PATENT OFFICE 1,952,105

HYDRAULIC BRAKE FLUID

Andrew T. K. Tseng, Detroit, Mich., assignor to Hydraulic Brake Company, Detroit, Mich., a corporation of California Application July 26, 1930, Serial No. 471,048

23 Claims. (Cl. 252—5)

My invention relates to systems for the hydraulic transmission of power and is more particularly described herein as applied to the hydraulic brake system of a vehicle, such as an automobile or air-plane. In order fully to appreciate the present invention it is necessary to understand the conditions under which hydraulic brake systems operate and the problems resulting therefrom.

Hydraulic brake systems include metal and rubber parts which are exposed to the liquid used as a power transmitting medium and it is essential that a liquid be used which will not attack either the metal or rubber parts of the brake system either at ordinary temperatures or at the increased temperatures obtaining in the parts of the system adjacent the brake shoes during a prolonged application of the brakes. It is furthermore necessary that the brake fluid have a high boiling point so that it will not vaporize under operating conditions and create gas pockets in the system which might render the brakes entirely ineffective. The brake fluid must also have a low freezing point to withstand the colder winter temperatures and high altitude temperatures without freezing and the viscosity of the brake fluid should not change materially between its vaporizing and freezing points. The brake fluid must also have an extremely low rate of vaporization and must further have sufficient lubricating properties to properly lubricate the moving parts of the brake system.

It is an object of my invention to provide a brake fluid which will meet all of the above-named exacting conditions far better than will any of the brake fluids now known or in commercial use.

Another object of my invention is to provide a brake fluid which will not attack the rubber or metal parts of a brake system.

Another object of my invention is to provide a brake fluid which can be manufactured cheaply.

Another object is to provide a brake fluid which will not volatilize in use.

Another object is to provide a brake fluid which has an extremely low rate of evaporation.

Another object is to provide a brake fluid which will leave a protective coating on the parts of the brake system, thereby protecting them against corrosion after practically all of the brake fluid has evaporated.

Another object is to provide a brake fluid which has a low freezing point.

Another object is to provide a brake fluid which has a substantially uniform viscosity between its freezing and boiling points.

Other objects and advantages will be apparent from reading the description in the light of the accompanying drawings.

In the drawings,

Fig. 1 is a diagrammatic illustration of an automobile chassis, showing a hydraulic brake system applied thereto;

Fig. 2 is an enlarged section through one of the wheel brakes, taken on the line 2—2 of Fig. 1;

Figure 3:
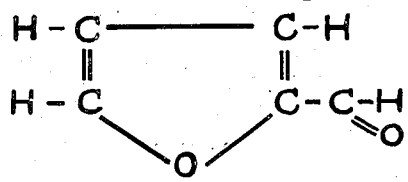
Figs. 3, 4, 5 and 6 are the graphic formulas of the more important furane ring compounds comprehended in my invention.
Figure 5:
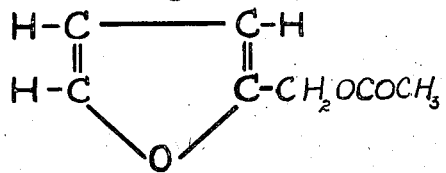
Figure 4:
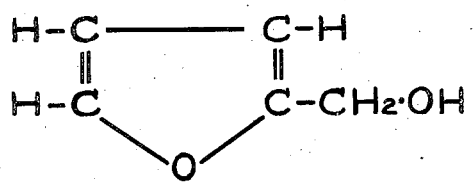
Figure 6:
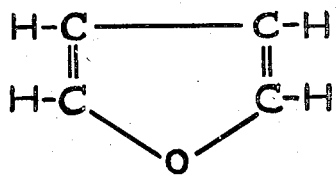

Referring particularly to Fig. 1 of the drawings, I have illustrated a conventional automobile chassis 10 having a hydraulic brake system applied thereto. The hydraulic brake system is shown as comprising a reservoir 12 containing a master cylinder operated by the usual foot pedal (not shown), metal conduits 14, usually containing 98 to 99 per cent copper and 1 to 2 per cent zinc, flexible hoses 16 of rubber and fabric composition, and wheel brake mechanism shown more clearly in Fig. 2. This wheel brake mechanism includes wheel brake cylinders 18 commonly made of cast iron, reciprocable pistons 20 usually formed of an aluminum alloy containing lead, antimony, aluminum, silicon, magnesium and tin, rubber packing cups 22, and a steel spring 24 for holding the packing cups 22 in engagement with the faces of the pistons 20. The pistons 20 act upon piston stems 26 to urge brake shoes 28 outwardly, thereby forcing brake lining 30 into engagement with the brake drum 32. Retractile springs 34 return the brake shoes 28 and pistons 20 to normal position upon the release of fluid pressure in the brake system.

The brake fluid is relied upon to lubricate the pistons 20 in the wheel brake cylinders and also the piston in the master cylinder which is not shown in the drawings but which may be of the type illustrated in Loughead and Loweke Patent No. 1,758,671, issued May 13, 1930.

The brake fluid must be of such a nature that it will not attack any of the metals used in the various parts of the brake system and it is of the utmost importance that the brake fluid should not attack the rubber of the flexible hoses 16 or the rubber packing cups 22. The latter are particularly sensitive as any swelling or other deterioration of these packing cups would seriously interfere with the operation of the system.

Where the brakes are applied for a relatively long period of time, as during the descent of a mountain or long hill, the brake drum 32, brake shoes 28, and adjacent mechanism become heated and some of this heat is transmitted to the wheel cylinder 18 and the brake fluid contained therein, and it is important that the brake fluid have a sufficiently high temperature of vaporization to withstand the temperatures resulting from prolonged application of the brakes without vaporization, as vaporization of the brake fluid would create gas pockets in the brake system which, under certain conditions, would seriously interfere with the operation of the brakes.

Figure 7:
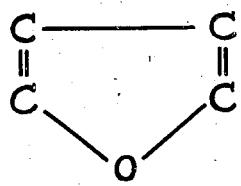
Fig. 7 is the graphic formula of the furane ring per se.

I have found that furfural aldehyde and other furane ring compounds are eminently suited as fluids for hydraulic brake systems and meet all of the exacting requirements for such fluids much better than do the alcohol and castor-oil solutions now in common commercial use, and are a tremendous improvement over any brake fluid heretofore known. By the expression "furane ring compound" I mean a chemical compound which contains the furane ring illustrated in Fig. 7 of the accompanying drawings. For purposes of convenience, such a compound can be considered as obtained from furane by the substitution of an element or group of elements for one or more of the hydrogen atoms of furane.

With the present knowledge of chemical processes for the manufacture of furane ring compounds, furfural aldehyde is by far the cheapest furane ring compound now obtainable and for this reason alone it is at present the most practical furane ring compound brake fluid. Furfuryl alcohol, furfural acetate, and numerous other furane ring compounds are equally well adapted for use as brake fluids and many of these furane ring compounds, such as furfuryl alcohol, furfuryl acetate, and several others, are even better adapted for brake fluid use than is furfural aldehyde because of their lower freezing temperatures.

I have found that what is known commercially as "technical" furfural aldehyde will withstand a temperature of minus 60° F. without freezing, regardless of the length of exposure to such temperature. This is a sufficiently low freezing point for ordinary conditions but vehicles using hydraulic brake systems are sometimes subjected to lower temperatures than minus 60° F. In order to provide a brake fluid which will withstand temperatures lower than minus 60° F., it is necessary to add what I prefer to term a "diluent" to furfural aldehyde in order to lower its freezing point. Wherever the word "diluent" is used in this specification, it is understood as meaning a substance which is added solely for the purpose of reducing the freezing temperature and has no significance whatsoever in so far as the viscosity of the base substance is concerned. Many substances are suitable for use as diluents but I consider that the following substances are best suited for such use at the present time:

Ethylene dichloride
Diethylene glycol
Ethylene glycol
Monoethylether ethylene glycol
Monoethylether diethylene glycol
Cellosolve acetate
Diethylene oxide
Butyl cellosolve
Monoacetate glycol
Butyl ether diethylene glycol
Furfuryl alcohol
Furfuryl acetate
Propyl furoate
Methyl furoate
Ethyl furoate
Butyl furoate
Butyl alcohol
Diacetone alcohol Under present manufacturing conditions it is common for the manufacturer of hydraulic brake systems to make extra parts therefor which are not immediately installed as factory equipment on vehicles but which are sent out to various service stations as repair parts, and such repair parts frequently lie on shelves in stock-rooms for many months or even years before being actually installed in a brake system. Completely assembled master cylinders and wheel brake cylinders are commonly sent out as such repair parts and it is essential that the pistons, packing cups, cylinder walls and similar exposed parts of such assemblies be protected against corrosion when they stand unused over long periods of time. In accordance with present commercial practice, the manufacturer dips such cylinder assemblies in brake fluid before shipping such assemblies to dealers and service stations and the brake fluid must therefore be of such a nature that it will form an adequate protection for such assemblies.

A necessary characteristic of a satisfactory brake fluid, therefore, must be a rate of evaporation much lower than that dictated by ordinary usage in a brake system of an automobile in operation and, furthermore, a successful brake fluid must provide a coating which will protect the surfaces of such parts against corrosion even after practically all of the brake fluid has evaporated. Therefore, while furfural aldehyde evaporates very slowly I find it desirable to add a substance which will still further retard the rate of evaporation and which will increase the protective coating left on the parts after substantially all of the brake fluid has evaporated. Substances added for this purpose are referred to herein as "retardants".

Many substances can be added to furfural aldehyde as retardants but I believe that the most satisfactory retardants now known are as follows:

Butyl cellosolve
Diethylene glycol
Monoacetate glycol
Butyl ether diethylene glycol
Ethylene glycol
Olive oil
Mineral oil (white)
Castor-oil
Cocoanut oil
Halowax oil
Cyclohexanol
Diethylphthalate
Dibutylphthalate
Furfuryl acetate
Furfuryl alcohol
Methyl furoate
Propyl furoate
Ethyl furoate
Butyl furoate It should be noted that several substances are listed both as diluents and retardants since such substances have the triple characteristics of reducing the rate of evaporation, lowering the freezing point, and improving the protective coating which is left as a residue on the parts exposed to the brake fluid.

Diethylene glycol is included in the above lists of diluents and retardants in spite of the fact that this substance attacks iron and steel. Where diethylene glycol is used I contemplate wheel cylinders 18 and reservoir 12, including the master cylinder therein, formed by die castings, the usual die-cast metal being a non-ferrous alloy of zinc, tin, magnesium, aluminum and lead. In such a system the springs 24 in the wheel cylinders and the spring in the master cylinder could be either brass springs or steel springs coated with nickel or chromium. Such a non-ferrous brake system is entirely practical from a commercial standpoint, with the present improved process and reduced cost of die-casting.

As I have previously pointed out, furfural aldehyde alone is an entirely satisfactory brake fluid for ordinary operating conditions. The following specific examples of brake fluids comprising furfural aldehyde mixed with substances which lower its freezing point, reduce its rate of evaporation and improve the protective coating left as a residue on the parts of brake systems, are typical examples of what may be considered as universal brake fluids capable of fulfilling all conditions.

| I | Per cent |
|---|---|
| Furfural aldehyde | 70 to 90 |
| Furfuryl alcohol | 10 to 30 |

| II | Per cent |
|---|---|
| Furfural aldehyde | approximately 78 |
| Furfuryl alcohol | approximately 20 |
| Cyclohexanol | approximately 2 |

| III | Per cent |
|---|---|
| Furfural aldehyde | 50 to 70 |
| Diethylene glycol | 30 to 50 |

| IV | Per cent |
|---|---|
| Furfural aldehyde | 70 to 90 |
| Methyl furoate | 10 to 30 |

| V | Per cent |
|---|---|
| Furfural aldehyde | 40 to 95 |
| Castor-oil | 1 to 5 |
| Butyl ether diethylene glycol | 4 to 55 |

| VI | Per cent |
|---|---|
| Furfural aldehyde | 50 to 70 |
| Glycolmonoacetate | 10 to 30 |
| Butyl carbitol | 10 to 40 |

While I have described my invention in detail as applied to hydraulic brake systems, it is to be understood that some features of my invention are equally applicable to hydraulic power transmission means other than that used in the application of brakes.

In this specification I have used the chemical term "furane ring compound" to describe the various chemical compounds which are commonly known in commercial parlance as "furfural derivatives" because of the fact that "furfural", (as furfural aldehyde is known commercially,) is the basis from which all other furane ring compounds are obtained by the present commercial processes.

What I claim and desire to secure by United States Letters Patent is:

1. A solution for the transmission of power comprising a furane ring compound and a retardant adapted substantially to reduce the rate of evaporation of the furane ring compound.

2. A solution for the transmission of power comprising a furane ring compound and a diluent adapted substantially to reduce the freezing point of the furane ring compound.

3. A solution for the hydraulic transmission of power comprising a furane ring compound, a diluent adapted substantially to reduce the freezing point of the furane ring compound, and a retardant adapted substantially to reduce the rate of evaporation of the furane ring compound.

4. A solution including a furane ring compound and 10 to 30 per cent diluent adapted substantially to reduce the freezing point of the furane ring compound.

5. A solution for the hydraulic transmission of power comprising a furane ring compound, 10 to 30 per cent diluent adapted substantially to reduce the freezing point of the furane ring compound, and 1 to 10 per cent retardant adapted substantially to reduce the rate of evaporation of the furane ring compound.

6. A solution for the hydraulic transmission of power including two furane ring compounds.

7. A solution for the hydraulic transmission of power including a furane ring compound and a compound derived from a member of the ethylene series.

8. A process of power transmission which comprises transmitting power by means of substantially pure furfural aldehyde.

9. A solution for the hydraulic transmission of power including furfural aldehyde.

10. A solution for the hydraulic transmission of power comprising a furane ring compound as a base and a second furane ring compound as a diluent adapted substantially to reduce the freezing point of the furane ring compound.

11. A solution for the hydraulic transmission of power comprising furfural aldehyde and cyclohexanol.

12. A solution for the hydraulic transmission of power comprising furfural aldehyde and furfuryl alcohol.

13. A solution for the hydraulic transmission of power comprising furfural aldehyde, cyclohexanol, and furfuryl alcohol.

14. A solution for the hydraulic transmission of power comprising a furane ring compound and a carbitol.

15. A solution for the hydraulic transmission of power comprising a furane ring compound as a base and an alcohol as a diluent therefor.

16. A solution for the hydraulic transmission of power comprising a furane ring compound and an oil retardant adapted substantially to reduce the rate of evaporation of the furane ring compound.

17. A solution for the hydraulic transmission of power comprising a furane ring compound and a glycol diluent adapted substantially to reduce the freezing point of the furane ring compound.

18. A solution for the hydraulic transmission of power comprising furfural aldehyde, an oil, and a glycol compound.

19. A fluid for the hydraulic transmission of power consisting of a substantially pure furane ring compound.

20. A brake fluid comprising a furane ring compound.

21. A brake fluid consisting of a furane ring compound and diethylene glycol.

22. A fluid for the hydraulic transmission of power consisting of substantially pure furfural aldehyde.

23. A fluid for the hydraulic transmission of power comprising a furane ring compound and diethylene glycol.

ANDREW T. K. TSENG.